(12) United States Patent
Grzesiak

(10) Patent No.: US 9,689,655 B2
(45) Date of Patent: Jun. 27, 2017

(54) MEASUREMENT METHOD

(75) Inventor: Jean-Louis Grzesiak, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 390 days.

(21) Appl. No.: 13/122,499

(22) PCT Filed: Oct. 29, 2009

(86) PCT No.: PCT/GB2009/002576
§ 371 (c)(1),
(2), (4) Date: Apr. 4, 2011

(87) PCT Pub. No.: WO2010/049693
PCT Pub. Date: May 6, 2010

(65) Prior Publication Data
US 2011/0184695 A1 Jul. 28, 2011

(30) Foreign Application Priority Data

Oct. 29, 2008 (GB) .................................. 0819826.9
Oct. 29, 2008 (GB) .................................. 0819828.5

(51) Int. Cl.
G01B 5/008 (2006.01)
G01B 5/20 (2006.01)
G01B 21/04 (2006.01)

(52) U.S. Cl.
CPC ............. *G01B 5/008* (2013.01); *G01B 5/20* (2013.01); *G01B 21/042* (2013.01)

(58) Field of Classification Search
CPC ..................................................... G01B 5/008
(Continued)

(56) References Cited

U.S. PATENT DOCUMENTS 4,084,323 A    4/1978  McMurtry
4,518,898 A    5/1985  Tarnowski et al.
(Continued)

FOREIGN PATENT DOCUMENTS

CN            101166950 A      4/2008
DE      10 2005 015 826 A1    10/2006
(Continued)

OTHER PUBLICATIONS

Chinese Office Action dated Aug. 31, 2012 from Chinese Patent Application No. 200980143127.6 (with English-language translation).

(Continued)

*Primary Examiner* — Ricky Ngon
(74) *Attorney, Agent, or Firm* — Oliff PLC

(57) ABSTRACT

This invention relates to a method for measuring a feature of an object that comprises obtaining a representation of at least the feature on the object by acquiring multiple data points via surface measurement of at least the feature. A model substantially replicating at least the feature of the object is fitted to the representation. The model comprises parameters defining at least two independently alterable portions that are linked at a common point. The fitting comprises changing the form of the model by altering at least one of the at least two independently alterable portions. The method also comprises obtaining information regarding at least the feature from the fitted model.

29 Claims, 10 Drawing Sheets

(58) Field of Classification Search
USPC .......................... 702/167, 33, 168; 703/6, 7
See application file for complete search history.

(56) References Cited

U.S. PATENT DOCUMENTS

| | | | |
|---|---|---|---|
| 5,088,046 | A | 2/1992 | McMurtry |
| 5,189,806 | A | 3/1993 | McMurtry et al. |
| 5,311,784 | A | 5/1994 | Girard et al. |
| 5,319,442 | A | 6/1994 | Rosser |
| 5,521,847 | A | 5/1996 | Ostrowski et al. |
| 5,681,981 | A | 10/1997 | McMurtry |
| 5,825,666 | A | 10/1998 | Freifeld |
| 6,064,759 | A | 5/2000 | Buckley et al. |
| 6,154,713 | A | 11/2000 | Peter et al. |
| 6,674,891 | B1 | 1/2004 | Sameshima |
| 7,126,700 | B2 | 10/2006 | Bao et al. |
| 7,228,254 | B2 * | 6/2007 | Numata et al. ............... 702/168 |
| 7,809,523 | B2 * | 10/2010 | Hunter et al. ................ 702/168 |
| 8,175,842 | B2 * | 5/2012 | Cameron et al. ............ 702/167 |
| 2003/0019119 | A1 | 1/2003 | Sato et al. |
| 2003/0167103 | A1 | 9/2003 | Tang et al. |
| 2004/0055170 | A1 | 3/2004 | Grzesiak et al. |
| 2004/0071334 | A1 | 4/2004 | Hassler et al. |
| 2005/0114059 | A1 | 5/2005 | Chang et al. |
| 2006/0266100 | A1 | 11/2006 | McMurtry et al. |
| 2007/0080967 | A1 | 4/2007 | Miller |
| 2007/0132990 | A1 | 6/2007 | Fukami et al. |
| 2007/0236234 | A1 | 10/2007 | Huebner |
| 2008/0205786 | A1 | 8/2008 | Young et al. |
| 2009/0123032 | A1 | 5/2009 | Kanisawa et al. |
| 2009/0307916 | A1 | 12/2009 | McLean et al. |
| 2010/0119104 | A1 | 5/2010 | Mamour et al. |
| 2010/0268355 | A1 * | 10/2010 | Chang et al. .................. 700/66 |

FOREIGN PATENT DOCUMENTS

| | | |
|---|---|---|
| EP | 0 166 270 A2 | 1/1986 |
| EP | 1 003 009 A1 | 5/2000 |
| EP | 1 256 779 A2 | 11/2002 |
| EP | 1 273 876 A2 | 1/2003 |
| EP | 1 760 422 A1 | 3/2007 |
| GB | 1 551 218 | 8/1979 |
| GB | 2 409 739 A | 7/2005 |
| GB | 2 420 414 A | 5/2006 |
| GB | 2 432 553 A | 5/2007 |
| JP | A-51-149050 | 12/1976 |
| JP | A-02-502581 | 8/1990 |
| JP | A-03-504278 | 9/1991 |
| JP | A-05-10751 | 1/1993 |
| JP | A-06-129846 | 5/1994 |
| JP | A-08-166259 | 6/1996 |
| JP | A-08-508579 | 9/1996 |
| JP | A-11-81935 | 3/1999 |
| JP | A-11-237344 | 8/1999 |
| JP | A-2002-541469 | 12/2002 |
| JP | A-2005-172830 | 6/2005 |
| WO | WO 90/07097 A1 | 6/1990 |
| WO | WO 91/20054 A1 | 12/1991 |
| WO | WO 92/09865 | 6/1992 |
| WO | WO 95/20747 A1 | 8/1995 |
| WO | WO 00/62015 A1 | 10/2000 |
| WO | WO 2005/050133 A | 6/2005 |
| WO | WO 2005/090900 A1 | 9/2005 |
| WO | WO 2006/024844 A2 | 3/2006 |
| WO | WO 2006/114567 A1 | 11/2006 |
| WO | WO 2006/115923 A2 | 11/2006 |
| WO | WO 2007/107776 A1 | 9/2007 |

OTHER PUBLICATIONS

British Search Report in British Patent Application No. GB0819828.5; dated Dec. 11, 2008.
British Search Report in British Patent Application No. GB0819826.9; dated Jan. 16, 2009.
International Search Report in International Application No. PCT/GB2009/002576; dated Apr. 16, 2010.
Written Opinion of the International Searching Authority in International Application No. PCT/GB2009/002576; dated Apr. 16, 2010.
Forbes, "Least-Squares Best-Fit Geometric Elements," National Physical Laboratory Report DITC 140/89, Apr. 1989, pp. 1-30.
Forbes, "Robust Circle and Sphere Fitting by Least Squares," National Physical Laboratory Report DITC 153/89, Nov. 1989, pp. 1-22.
Baldwin, "Bibliography of Papers, Reports, and Presentations Related to Point-Sample Dimensional Measurement Methods for Machined Part Evaluation," Sandia Report, SAND96-8237-UC-406, Apr. 1996, pp. 1-84.
Sep. 16, 2008 International Search Report issued in PCT/GB2008/001439.
Jun. 18, 2013 Office Action issued in Chinese Patent Application No. 200980143127.6 (with translation).
Jul. 14, 2010 Office Action issued in Chinese Patent Application No. 200880013684.1 (with translation).
Mar. 23, 2011 Office Action issued in Chinese Patent Application No. 200880013684.1 (with translation).
Feb. 28, 2012 Office Action issued in Chinese Patent Application No. 200880013684.1 (with translation).
Aug. 3, 2012 Office Action issued in Chinese Patent Application No. 200880013684.1 (with translation).
Mar. 29, 2013 Office Action issued in Japanese Patent Application No. 2010-504831 (with translation).
Jul. 2, 2013 Office Action issued in Japanese Patent Application No. 2011-533816 (with translation).
Aug. 7, 2012 Office Action issued in U.S. Appl. No. 12/450,991.
May 8, 2013 Office Action issued in U.S. Appl. No. 12/450,991.
Feb. 8, 2014 Office Action issued in Chinese Patent Application No. 200980143127.6 (with translation).
Dec. 11, 2013 Office Action issued in U.S. Appl. No. 12/450,991.
Dec. 2, 2015 Office Action issued in European Application No. 09 749 174.0.
Feb. 8, 2017 Office Action issued in European Patent Application No. 08 737 094.6.

* cited by examiner

MEASUREMENT METHOD

The present invention relates to a method for measuring an object, and in particular for measuring a face of a part of an object, the part being made up of a plurality of faces.

It is common practice, after workpieces have been produced, to inspect them on a co-ordinate measuring machine (CMM) having a quill which can be driven in three orthogonal directions X, Y, Z within a working volume of the machine. The quill may carry a measurement probe which produces a signal when it detects a surface of the workpiece being inspected, for example by contact between a stylus of the measurement probe and the surface.

Commonly, the CMM includes a computer programmed to take a series of readings of co-ordinate data at various locations on the workpiece, in order to perform a complete inspection of desired dimensions of the workpiece. A determination can then be made as to whether the workpiece is of acceptable quality, or whether it should be rejected.

An analogue (or scanning) contact probe typically comprises a housing (i.e. a probe body) with a deflectable stylus. The stylus has a surface contacting tip and deflection from its rest position is measured by transducers. The combination of stylus deflection with CMM position is used to determine the location of the stylus tip (and hence the coordinates of the point on the surface in which it is in contact). Such an analogue probe is described in GB 1551218.

It is known to mount a measurement probe on an articulating probe head which enables the orientation of the measurement probe to be varied, typically about two or more axes. Such an articulating probe head is described in European patent EP 0402440. The articulating probe head enables rotation about first and second orthogonal axes. Motors and transducers are provided in the articulating probe head to enable the measurement probe to be continuously positioned about rotation axes of the articulating probe head with the position being feedback to a computer.

A feature which has proved difficult to measure accurately using conventional techniques is a valve, in particular a valve seat, a valve guide and a valve disk. Valves are of particular importance to the automotive industry due to their use in the internal combustion engine. A badly fitting valve affects the efficiency of the engine. This could be due to a poor seal between the valve disk and valve seat or by the location of the valve seat preventing the valve from opening fully. The shape of the valve seat, valve guide and valve disk can also be particularly important. For instance, if they are not uniformly round, this can prevent a good fit and could therefore cause leakage. The width of the valve seat, being the dimension taken along the slope of the region on which the valve disk sits, can also be particularly important.

Valve seats are difficult and time consuming to measure by conventional techniques. Typically, a valve is conventionally measured by taking measurements along four lines from the top to the bottom of the valve seat, each line spaced 90 degrees about the circumference of the valve seat; these measurements enable the profile of the valve seat to be determined. The circumference of the valve seat is measured by following circular measurement paths at specific heights to determine the form and co-centricity with the valve guide. These measurements are typically taken with an analogue contact probe mounted on the quill of CMM and have the disadvantage that measurement is slow. The measurements are used to determine if the diameter of the valve seat is within tolerance. However, data is only available for the four measurement lines (i.e. and not between them). Also, due to the measurement point distribution, it is difficult to determine circularity of the valve seat.

The present invention provides an improved method for measuring a feature of an object, and in particular for measuring a feature of a valve.

According to a first aspect of the invention there is provided a method for measuring a feature of an object, the method comprising: obtaining a representation of at least the feature on the object by acquiring multiple data points via surface measurement of at least the feature; and fitting a model substantially replicating at least the feature of the object to the representation, the model comprising parameters defining at least two alterable portions that are linked at a common point, said fitting comprising changing the form of the model by altering at least one of the at least two alterable portions. The method can further comprise obtaining information regarding at least the feature from the fitted model.

Using the method of the invention it is possible to retrieve accurate information regarding the feature of the object (for example, measurement information, e.g. dimensional information including size information, and/or location information). Once the form of the model is manipulated such that it fits the representation of at least the feature, it is possible to obtain accurate measurement information from the model. The use of a unitary model of at least two alterable portions linked at a common point enables the contemporaneous fitting of the at least two portions of a model to the representation. This has been found to provide a more realistic fit of the model to the representation than, for instance, separately fitting to different portions of the model a plurality of completely individual portions of a model which are not linked in any way. When each portion of the model is treated individually with no link between them and each portion is fitted separately the point at which the adjacent portions intersect has to be assumed, which can lead to inaccuracies in aspects of the model which can be used to obtain important measurement information. The present invention avoids this by fitting a model that has at least two alterable portions that are linked at a common point, to the representation.

The alterable portions are independently alterable in that each of the portions can be altered independently (i.e. individually or separately) of the other.

Accordingly, alteration of one portion doesn't necessarily have to have a knock-on effect on the other portion(s). For example, the size of one of the portions can be changed independently of the size of the other portion(s). However, as will be understood, as the portions are linked (e.g. tied) in some way alteration of one of the portions could have a knock-on effect on the other portion(s) linked to it, depending on how the portion is altered and how the model is controlled. For example, if the position and/or orientation of one of the portions is altered then this could have an effect on the other portion(s) linked to it.

As will be understood, the form can comprise the shape of the model. The form can comprise the size of the model. Fitting can further comprise manipulating the relative location of the model and representation.

As will be understood the representation can be a digital representation of the feature. The representation could describe the location of a plurality of points on at least the feature in a two-dimensional space. The representation could describe the location of a plurality of points on at least the feature of the object in a three-dimensional measurement space. Accordingly, the representation could comprise what is commonly known as a point cloud.

As will be understood, a model can comprise parameters defining the nominal geometry of the feature of the object. This could be the expected or desired geometry of the feature of the object.

Each of the at least two independently alterable portions can be configured to replicate a particular aspect of the object. The aspects of the object can be any aspect of the object for which measurement information is to be obtained. For example, each of the at least two independently alterable portions can be configured to replicate a particular region of the surface of the object. At least one of the at least two independently alterable portions can be configured to replicate a particular aspect of at least the feature of the object, such as a particular region of the surface of the feature. A region could be a uniform region of the surface of the object. Accordingly, the at least two independently alterable portions could each be configured to replicate different uniform regions of the object.

At least one parameter can define the point at which the portions are linked. Accordingly, at least one parameter can replicate the interface of at least two aspects, for instance of at least two regions of the surface, of the object. This can be useful as the measurement information can be derived from the at least one parameter that defines the point at which the portions are linked. This can enable measurement information to be obtained about the point at which different aspects of the object interface. For example, this can enable measurement information to be obtained about the point at which different regions of the surface of the object meet.

Accordingly, in line with the above, the at least two independently alterable portions can replicate different regions of the surface of the object, and can be linked along a common edge. Accordingly, at least one of the at least two independently alterable portions of the model could replicate a region of the object's surface that is substantially planar. A region can have a regular or irregular geometrical shape. Accordingly, at least one of the at least two independently alterable portions could replicate a region of the object's surface that is substantially looped. The looped region can have a cross-sectional shape that is a regular or irregular geometrical shape. For instance, the looped region can be substantially circular, triangular, square, or hexagonal in cross-sectional shape. At least one of the at least two independently alterable portions could replicate a region of the object's surface that is substantially tubular in configuration. For instance, at least one of the at least two independently alterable portions could replicate a region of the object that is substantially cylindrical in configuration. Optionally, at least one of the at least two independently alterable portions could replicate a region of the object's surface that is substantially conical in configuration.

Fitting can comprise manipulating the parameters of the model such that the point at which the at least two independently alterable portions are linked is changed. This can comprise manipulating the location and/or orientation of the point at which the at least two independently alterable portions are linked. Optionally, this can comprise manipulating the form of the point at which the at least two independently alterable portions are linked. For example, when the portions are linked by an edge, this can comprise manipulating the shape and/or the dimensions of edge along which the at least two independently alterable portions are linked.

The model can comprise parameters defining a series of at least three alterable portions of which at least one portion ("the intermediate portion") is linked to the other two portions. The alterable portions are independently alterable in that each of the portions can be altered independently (i.e. individually or separately) of the other, as described above. The at least three alterable portions can replicate different regions of the surface of the object, and the intermediate portion can be linked along a first edge to one of the portions and linked along a second edge substantially opposite the first edge to the other portion. In this case, the parameters can describe edges of the different regions. Fitting the model can comprise manipulating the parameters relating to the edges. For instance, this can comprise manipulating the parameters to change the form of the edges and/or the location of the edges. The measurement information can comprise the distance between the substantially opposing edges. Accordingly, the measurement information can comprise the width of the intermediate portion.

At least one of the series of the at least three alterable portions can be a conical portion. Preferably, the intermediate portion of the at least three independently alterable portions is substantially conical. Preferably, the model comprises at least three alterable conical portions. The conical portions can converge to a common axis. The conical portions can converge to the common axis at different angles. In this case the parameters can relate to the edges along which the conical portions are linked. For instance, at least one parameter can describe a first edge of an intermediate conical portion with a first adjacent conical portion. At least a second parameter can relate to the angle between the axis to which all the conical portions converge and slope of the conical portions relative to the axis. At least a third parameter can describe a second edge of the intermediate conical portion with a second adjacent conical portion, the second edge being substantially opposite the first edge. The at least third parameter can describe the height along the axis between the first and second edges.

Fitting can comprise identifying different parts of the representation. In particular it can comprise identifying at least two parts, each of which are inferred to relate to one of the at least two alterable portions of the model. Fitting can then comprise using a different error function for each different part of the representation. Further still, fitting can comprise identifying at least one linking part of the representation that is inferred to relate to the point at which the at least two independently alterable portions are linked, and in which fitting comprises ignoring that at least one linking part. This can improve the efficiency of the fitting process.

The representation can comprise at least one part of the object adjacent the feature. In this case, preferably at least one of the at least two alterable portions of the model relates to the feature and at least one of the at least two alterable portions relates to the part of the object adjacent the feature. In particular, the representation can comprise at least two parts of the object that are each immediately adjacent the feature. In this case, preferably the model comprises at least three independently alterable portions, at least one of which relates to the feature, at least one of which relates to one of the at least two parts of the object immediately adjacent the feature, and at least the one of which relates to the other of the at least two parts of the object immediately adjacent the feature. This has been found to improve the fitting of the model to the representation and in turn improve the accuracy of the measurement information.

Suitable objects which the method is suitable for obtaining the dimensions of include valves, and in particular valve seat regions of a valve.

Fitting the model can comprise best fitting the model. That is the method can comprise manipulating the parameters defining the model to find the best fit with the representation. The best fitting can comprise using a least squares best fit.

The measurement information regarding at least the feature of the object can be compared to nominal data. In particular, the measurement information can be analysed to determine the deviations of at least the feature of the object to a nominal feature on a nominal object. This can, for instance, provide a form error.

The multiple data points can be collected using a surface sensing device mounted on a coordinate positioning apparatus. The surface sensing device may comprise a measurement probe. The coordinate positioning apparatus may comprise an articulating probe head which enables rotation of the measurement probe about two or more axes. The surface sensing device could comprise a non-contact measurement probe. Optionally, the surface sensing device comprises a contact measurement probe. The measurement probe could be a dual-state, or touch-trigger probe. In particular, the contact measurement probe could comprise an analogue (or scanning) measurement probe in which the extent of the deflection of the probe's stylus can be determined. Also, analogue or scanning probes can provide a stream of information/data relating to the stylus deflection. The coordinate positioning apparatus may comprise a coordinate positioning machine (CMM), machine tool, non-Cartesian machine, articulating arm, robotic arm or manual CMM.

The method of the invention could comprise the step of acquiring the multiple data points, i.e. via surface measurement of at least the feature of the object. However, as will be understood, this need not necessarily be the case. For instance, the multiple data points could have been acquired before performance of the method of the invention. In this case, obtaining the representation of the feature of the object can comprise receiving the representation. For example, this could comprise retrieving the representation from a memory device on which the representation is stored.

As will be understood, the above described method of the invention could be performed by a computer. Accordingly, at least some of the steps could be performed by at least one processor device. At least one of the representation and model could be obtained from at least one suitable storage device. The at least one storage device could be local or remote to the computer performing the method of the invention. A suitable storage device includes a magnetic storage device such as a hard-disc, a solid-state storage device such as a Flash memory device, and an optical storage devices such as a Compact Disc (CD) or a Digital Versatile Disc (DVD). In cases in which the storage device is remote to the computer, the representation and/or model could be retrieved over a communications link. As will be understood, the communications link could be wired or wireless. Accordingly, for example, at least one of the representation and model could be obtained over the internet from a remote storage device.

According to a second aspect of the invention there is provided a computer implemented method for measuring a feature of an object, the method comprising: taking a representation of at least the feature on the object; fitting a model replicating at least the feature of the object to the representation, the model comprising parameters defining at least two alterable portions that are linked at a common point, said fitting comprising changing the form of the model by altering at least one of the at least two alterable portions; and obtaining information regarding at least the feature from the fitted model.

The representation could comprise, for instance, multiple data points acquired, for example, via surface measurement of at least the feature According to a third aspect of the invention there is provided a computer program product comprising computer program code which, when executed by a computer, causes the computer to perform the above described method.

According to a fourth aspect of the invention there is provided a computer readable medium, bearing computer program code as described above.

This application also describes a method for determining object profile information in a plane, comprising: obtaining a series of three dimensional surface measurements of the object along a measurement path that extends through the plane; and deriving from the series of surface measurements that extend through the plane, data describing at least a part of the profile of the object in the plane.

This makes it possible to obtain information regarding the object's surface two-dimensional profile in a plane without actually performing a complete measurement of the surface profile in that plane. Rather the two dimensional profile information can be derived, for instance projected, from the measurement information obtained from the scan that extends through the plane and which extends in three dimensions. Accordingly, to determine the profile of an object in a particular plane it is not necessary to ensure during the scanning operation that the exact plane is measured. Rather, a broader sweep of the area containing the plane can be measured and the particular data regarding the plane derived from that sweep.

As will be understood, data describing at least a part of the profile can comprise data from which the form of the surface profile in the plane can be derived. As will be understood, the form can comprise the shape of the profile. The form can comprise the size of the profile. The data could comprise for instance a plurality of discrete points describing 2D position data of the surface in the plane. Optionally, the data could comprise for example a function, for instance a curve between two points, describing the shape and size of the surface in the plane. As will be understood, the profile can be the shape of the surface of the object taken in the plane. Accordingly, the invention reduces the three dimensional data obtained during the measurement of an object to two dimensional data (regarding the shape of the object) contained in the plane.

The plane can extend across at least a part of the surface of the object in any orientation relative to the object. In particular, the plane could extend substantially perpendicular to an axis extending along the length of the object. For example, the plane could be a transverse plane. For instance, the plane could be one which conceptually splits the object into upper and lower sections. The plane can extend substantially parallel to an axis extending along the length of the object. Accordingly, the plane could cross the measurement path at a plurality of points along the length of the object. For example, the plane could be a sagittal plane. For instance, the plane could one which conceptually splits the object into left and right hand sections. The profile can be a substantially complete cross-sectional profile of the object in the plane. The profile could be a part cross-sectional profile of the object in the plane.

The data describing at least a part of the profile can be derived by projecting the profile of the surface at the plane from at least some of the series of surface measurements. Projecting can comprise translating at least one surface measurement onto the plane. This could comprise extrapolation of at least one surface measurement onto the plane.

Projecting can comprise projecting the surface measurement onto the plane in a direction consistent with the shape of the object between the surface measurement and the plane. In particular, data describing a point on the plane can be derived by projecting the closest surface measurement onto the plane. This can be the surface measurement that has the shortest distance to the plane taken along the surface shape of the plane between the surface measurement and plane.

The data describing at least a part of the surface profile can be derived by projecting the profile of the surface at the plane from a subset of the series of surface measurements. The subset can comprise surface measurements contained in a band that also contains the plane. The subset can comprise solely of surface measurements contained in a band that also contains the plane. The subset of surface measurements from which the profile is projected can be located on opposing sides of the plane. The surface measurements in the subset can describe a complete revolution around the surface of the object.

Deriving data describing at least a part of the profile can comprise projecting the profile of the surface at the plane from a subset of the series of surface measurements. The subset of the series of surface measurement can cross the boundary between two different uniform parts of the object (e.g. between two different substantially uniform shaped parts of the object). In this case, when the plane extends across a first one of the two different uniform parts of the object, for those surface measurements taken on the other of the two different uniform parts projecting can comprise projecting the surface measurement in a direction consistent with the shape of the other of the two different uniform parts for the extent of that part and then projecting the surface measurement in a different direction that is consistent with the shape of the first one of the two different uniform parts.

The method can comprise selecting a first subset of consecutive surface measurements from the series of surface measurements. The first subset can describe a substantially complete revolution around the surface of the object. The plane for which the profile is to be determined can be contained in the band described by that first subset of surface measurements. The plane can be one which is located substantially midway between the first and last surface measurements in the band. The data describing at least a part of the surface profile can be derived by projecting the profile of the surface at the plane from at least some of the surface measurements in the first subset of consecutive surface measurements. The data describing at least a part of the surface profile can be derived by projecting the profile of the surface at the plane from at least half of the surface measurements in the first subset of consecutive surface measurements. The data describing at least a part of the surface profile can be derived by projecting the profile of the surface at the plane from substantially all of the surface measurements in the first subset of consecutive surface measurements.

The method can comprise selecting a plurality of subsets of surface measurements and for each subset projecting at least a part of the surface at a plane. The method can comprise selecting a plurality of subsets of consecutive surface measurements from the series of surface measurements that describe a complete revolution around the surface of the object. Accordingly, the method can comprise determining profile information about a plane in each of the plurality of subsets.

The method can further comprise determining the deviation of the at least part profile from nominal profile information. For example, the method can comprise analysing the derived data relating to the profile of the object in the plane to determine deviations of the at least part profile from nominal data. In particular, the method can comprise analysing the derived data relating to the profile of the object in the plane to determine the form error of the at least part profile. For instance, in embodiments in which the profile is circular, the form error can comprise the circularity of the profile. Determining the deviation can comprise fitting nominal profile data (e.g. a nominal profile model) to the derived data. Fitting can comprise best fitting. The best fitting can comprise using a least squares best fit. Determining the deviation can comprise determining the deviation of at least some of the derived data from the fitted nominal profile.

Accordingly, the method can comprise analysing the derived data relating to the profile of the object in the plane to determine if it complies with predetermined criteria. In particular, it can comprise analysing the derived data relating to the profile of the object in the plane to determine if it complies with predetermined shape criteria, for instance predetermined circularity criteria.

The measurement path can extend obliquely through the plane. The measurement path can progress along the length of the object around at least a part of its perimeter. The measurement path can progress along the length of the object around its perimeter in a substantially cyclical manner. The measurement path could oscillate along the length of the object. The measurement path can progress in a substantially winding manner along the length of the object. Preferably, the measurement path progresses in a substantially helical manner along the length of the object.

The method could comprise, for each of a plurality of planes that extend across the object, determining data relating to the surface profile of the object for that plane from said series of surface measurements that extend obliquely to the plane. In particular, the method can further comprise, deriving data relating to the surface profile of the object for a plurality of planes from the series of the measurements that extend through those planes.

The object's transverse cross-sectional profile can be substantially round, in particular substantially circular. However, this need not necessarily be the case. For instance, the cross-sectional profile could be elliptical, or other regular/non-regular shapes, for example, square, hexagonal, etc.

The cross-sectional size of the object could be non-uniform along its length. Accordingly, the object could be conical, for instance. Optionally, the cross-sectional size of the object could be substantially along its length. For instance, the object could be cylindrical.

The method can further comprise fitting a line to a selection of the surface measurements adjacent a line extending along the length of the object and which crosses the measurement path at a plurality of points along the length of the object. The method can further comprise fitting at least a second line to a second selection of surface measurements adjacent a line extending along the length of the object and which crosses the measurement path at a plurality of points along the length of the object, in which the first and at least second selection of surface measurement have no surface measurements in common.

The plane can extend along the length of the object such that it crosses the measurement path at a plurality of points along the length of the object. In particular, the plane can extend substantially parallel to the longitudinal axis of the object. The method can further comprise fitting a line to the derived data. As will be understood, the line can substantially follow the nominal profile of the object along the longitudinal axis of the object. Accordingly, depending on the nominal shape of the object the line can be a single straight line. The line could comprise at least one bend along its length. The line could be curved.

The method can further comprise deriving second data describing at least a part of the profile of the object in a second plane that extends along the length of the object such that it crosses the measurement path at a plurality of points along the length of the object. In particular, the second plane can extend substantially parallel to the longitudinal axis of the object. The method can then further comprise fitting a second line to the second data. The second plane can spaced apart from the plane around the perimeter of the object. Preferably the first and second planes each extend substantially parallel to the longitudinal axis of the object.

The fitted line(s) can be used to obtain information regarding the straightness of the object.

As will be understood, the object could comprise a valve. In particular, the object could comprise at least one of a valve seat or a valve guide.

As will be understood the method could be computer implemented. Accordingly, there can be provided a computer program product comprising computer program code which, when executed by a computer, causes the computer to perform the above described method. Further, there can be provided a computer readable medium, bearing computer program code as described above.

This application further describes, a method of determining the form of a surface along the length of an object comprising: obtaining a series of surface measurements of the object along a measurement path that progresses along the length in a manner that extends cyclically across the length of the object, to obtain a plurality of measurements between first and second ends of the object; fitting a line to a selection of the surface measurements adjacent a line extending along the length of the object and which crosses the measurement path at a plurality of points along the length of the object. Fitting can comprise projecting at least some surface measurements onto a plane, which extends through the surface and along the length of the line which is to be fit, in a direction consistent with the shape of the object between the surface measurement and the line. The surface measurements projected onto the plane can be those that are adjacent the plane. In particular, the surface measurements projected onto the plane can be those along the plane that have the shortest distance to the plane in a dimension taken along the shape of the object between the surface measurement and the plane. Fitting can comprise fitting the line to the projected points on the plane. The method can further comprise fitting at least a second line to a second selection of surface measurements adjacent a line extending along the length of the object and which crosses the measurement path at a plurality of points along the length of the object, in which the first and at least second selection of surface measurement have no surface measurements in common. The first and at least second selection of surface measurement can be contained in lines that extend parallel to each other. The fitted lines can be used to obtain information regarding the straightness of the object.

An embodiment of the invention will now be described, by way of example only, with reference to the following Figures, in which.

Figure 17A:
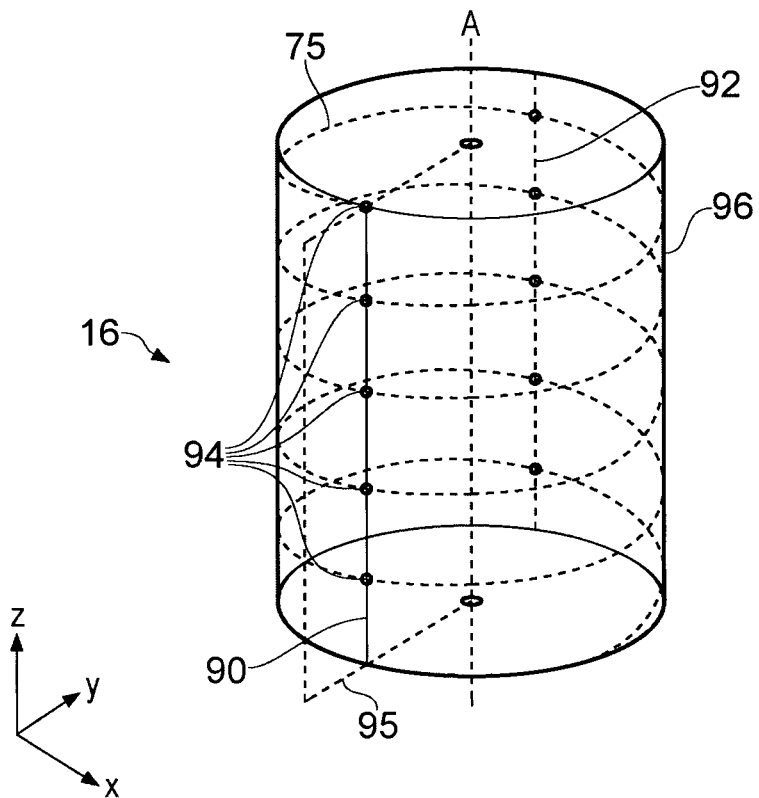
Figure 18:
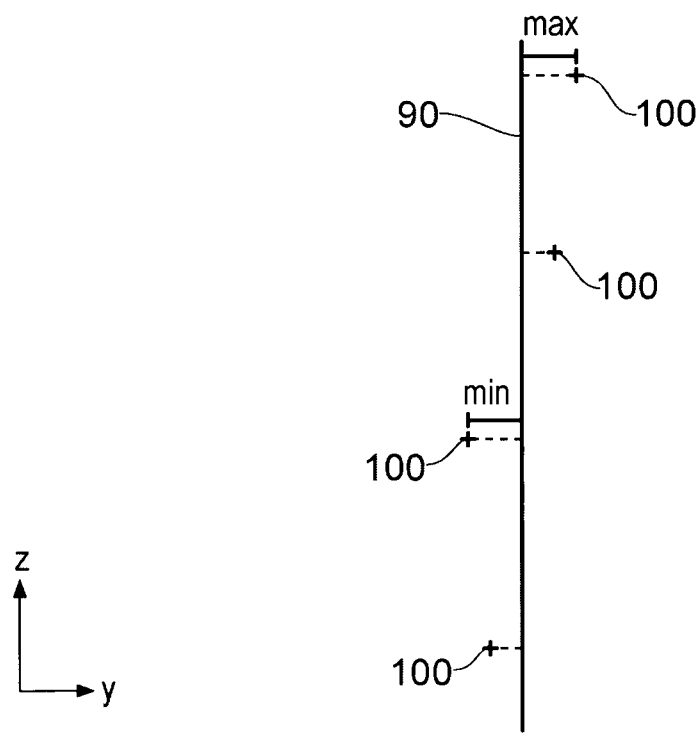

FIGS. 17(a) and (b) illustrate the determination of straightness information from helical scan information; and FIG. 18 illustrates the deviation of projected measurement points from nominal data to determine information on the profile of the valve guide.

Figure 1:
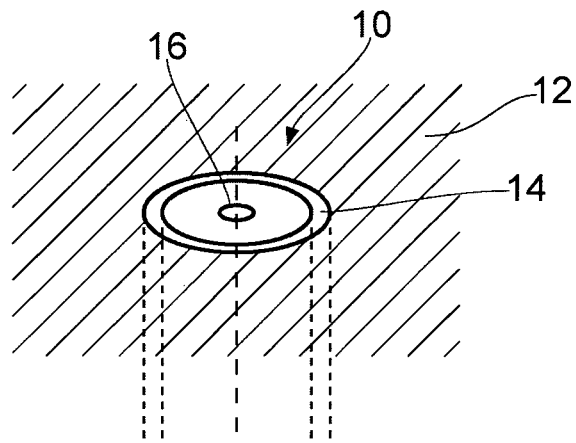
FIG. 1 is a schematic perspective view of a valve in a valve body.
Figure 2:
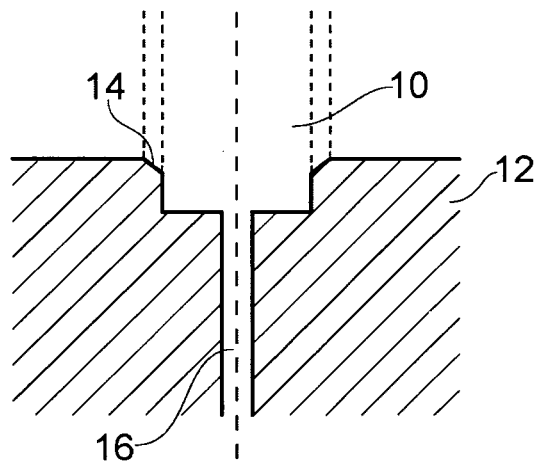
FIG. 2 is a side cross sectional view of the valve seat part and valve guide of FIG. 1.
Figure 3:
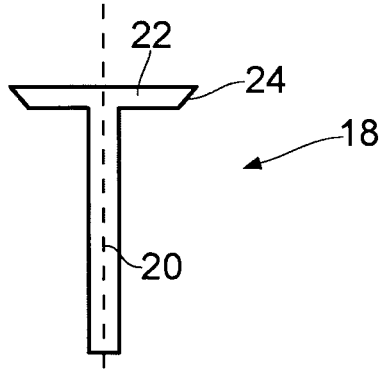
FIG. 3 is a side view of a valve disc.

With reference to FIGS. 1 to 3 the valve seat part 10 is located in a valve body 12. The valve seat part 10 comprises a number of features, in particular a conical region 14 defining a recess in the valve body, leading to a valve guide 16 which is substantially cylindrical in shape. As shown in more detail in FIG. 11, the valve seat part 10 actually comprises three conical features: an upper conical region 11, a middle conical region 13 (hereinafter referred to as the "valve seat 13") and a lower conical region 15. Referring to FIG. 3, the valve disk 18 comprises a cylindrical stem 20 sized to fit snugly within the valve guide 16. A disk member 22 is provided at one end of the stem 20, the disk member 22 having a conical surface 24 on its circumferential surface. The valve seat part 10 and disk member of the valve disk have corresponding conical surfaces 14, 24 which form a seal when the valve disk is inserted into the valve seat. In particular, the conical surface 24 is configured to fit snugly against the valve seat 13.

A feature of the valve seat part 10 requiring to be made to a high degree of accuracy is the valve seat 13; a good fit between the valve seat 13 and conical surface 24 of the valve disk 18 is required for good operation of the valve. Furthermore, it is important that the shape of the valve guide 16 is as close to circular as possible. If the valve seat 13 or valve guide 16 is incorrectly shaped or positioned, the quality of the seal is compromised. For example, the valve seat 13, or cylindrical surface of the valve guide 16, may be the incorrect size or may not be accurately circular. The surface may have been machined in the wrong lateral position or the wrong height or may have been machined at the wrong angle.

Figure 4:
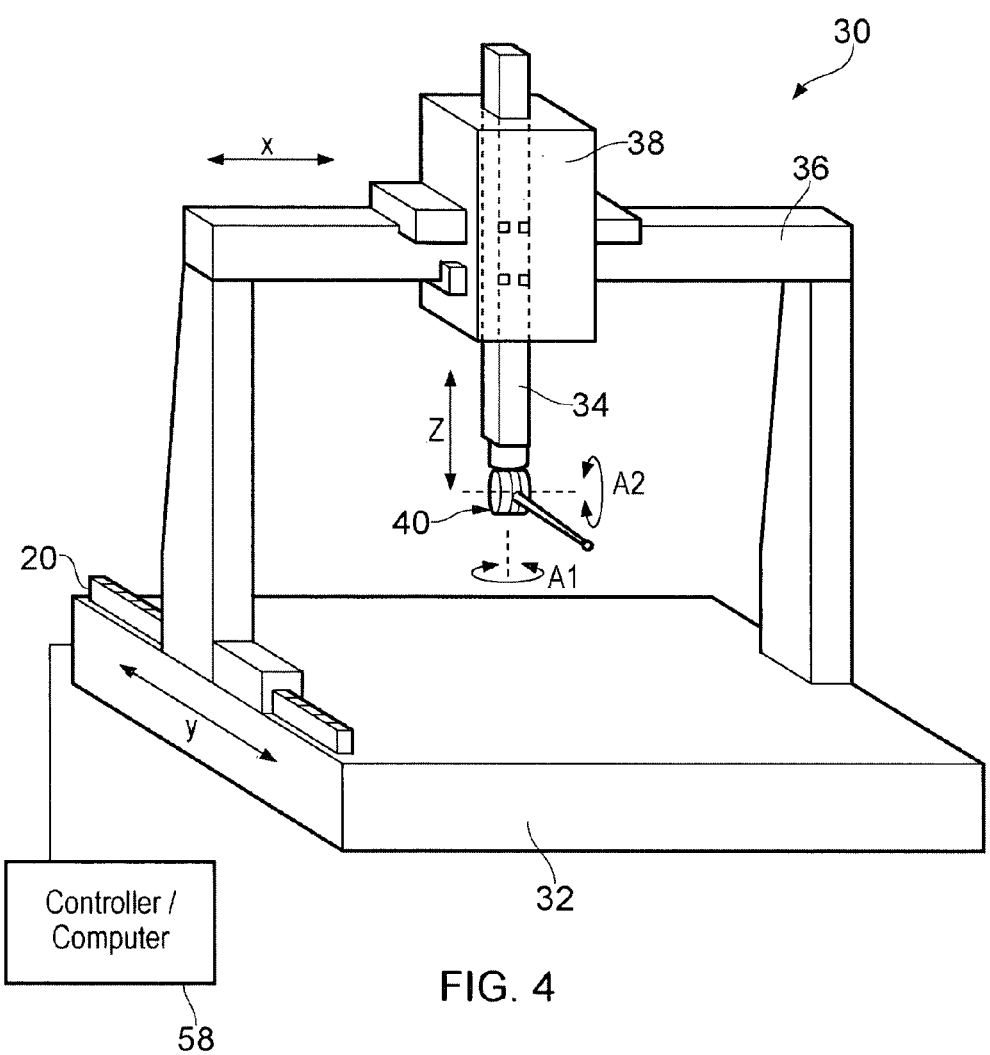
FIG. 4 is a perspective view of an articulating probe head mounted on a coordinate measuring machine.

FIG. 4 illustrates the apparatus used to measure the valve according to the present invention. The workpiece containing the valve seat part 10 and valve guide 16 is mounted on a coordinate positioning apparatus, such as a coordinate measuring machine (CMM) 30. The CMM 30 has a table 32 on which the workpiece can be mounted. A Z column is moveable in X, Y and Z relative to the table 32, this motion being enabled by a series of carriages 36, 38, 34 able to move in X, Y and Z respectively, each of the carriages being provided with bearing arrangements, motors and transducers (not shown).

An articulating probe head 40 is mounted on the Z column 34 of the CMM, which provides rotational motion of a surface sensing device such as a measurement probe mounted on it. The articulating probe head is described in more detail with reference to FIG. 5.

Figure 5:
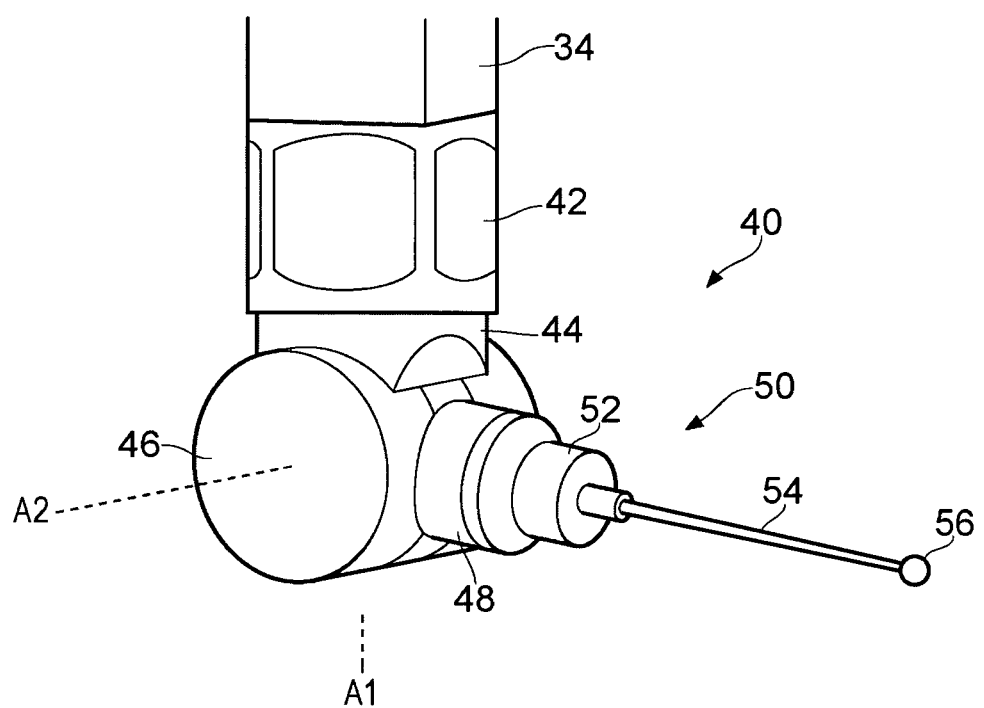
FIG. 5 is a perspective view of an articulating probe head and measurement probe.

As illustrated in FIG. 5, the articulating scanning head 40 comprises a fixed part formed by a first housing 42 mounted onto the Z column 34. The first housing 42 supports a movable part 44 which is rotatable by a motor (not shown) relative to the first housing 42 about an axis A1. The movable part 44 is secured to a second housing 46 which in turn supports a shaft 48 rotatable by a motor (not shown) relative to the housing 46 about an axis A2, substantially perpendicular to the axis A1.

A surface sensing device, in this example a contact measurement probe 50, is mounted on the shaft 48 of the articulating probe head. The contact measurement probe 50 is provided with a probe housing 52 and deflectable stylus 54 having a workpiece contacting tip 56.

The arrangement described above is such that the motors of the articulating probe head can position the workpiece contacting tip 56 of the measurement probe 50 angularly about the axes A1 or A2 and the motors of the CMM (not shown) can position the articulating probe head linearly anywhere within the three-dimensional coordinate framework of the CMM to bring the stylus tip into a predetermined relationship with the surface being scanned.

Linear position transducers (not shown) are provided on the CMM for measuring linear displacement of the articulating probe head and angular position transducers are provided in the articulating probe head (not shown) for measuring angular displacement of the stylus about the respective axes A1 and A2. The measurement probe 50 is also provided with transducers to determine deflection of the stylus 54.

The motion of the CMM and the articulating probe head is controlled by a controller, which may, for example, comprise a bespoke controller and/or a computer 58 (e.g. a general purpose computer such as a personal computer (PC)). The controller sends a drive command to the CMM and articulating probe head to drive their respective motors and thereby position the measurement probe. The controller receives feedback from transducers in the CMM, articulating probe head and measurement probe which enable it to determine the position of the probe tip.

The articulating probe head may be mounted on other types of coordinate positioning apparatus, such as on the spindle of a machine tool, a manual CMM, robotic arm or articulating arm. The coordinate measuring machine is not limited to being a Cartesian type machine, as described in FIG. 4, it may also be a non-cartesian type, as described in international patent application WO 95/20747.

An example method of operation of the apparatus will now be described with reference to FIGS. 6 to 13. A high level overview of the method is illustrated by the flow chart 100 in FIG. 7.

The method begins at step 102 by the controller 58 controlling the probe 50 to perform a helical scan of the valve seat part 10 so as to obtain a representation of the valve seat part in the form of a cloud of data points (i.e. a point cloud) which each describe a particular point on the valve seat part 10 in a three dimensional space. The conical surface 14 of the valve seat part 10 is scanned using the technique for measuring bores as disclosed in WO90/07097 but by adapting the scan to take into account for the non uniform radius (i.e. a conical rather than a cylindrical surface), as described in more detail below.

Figure 6:
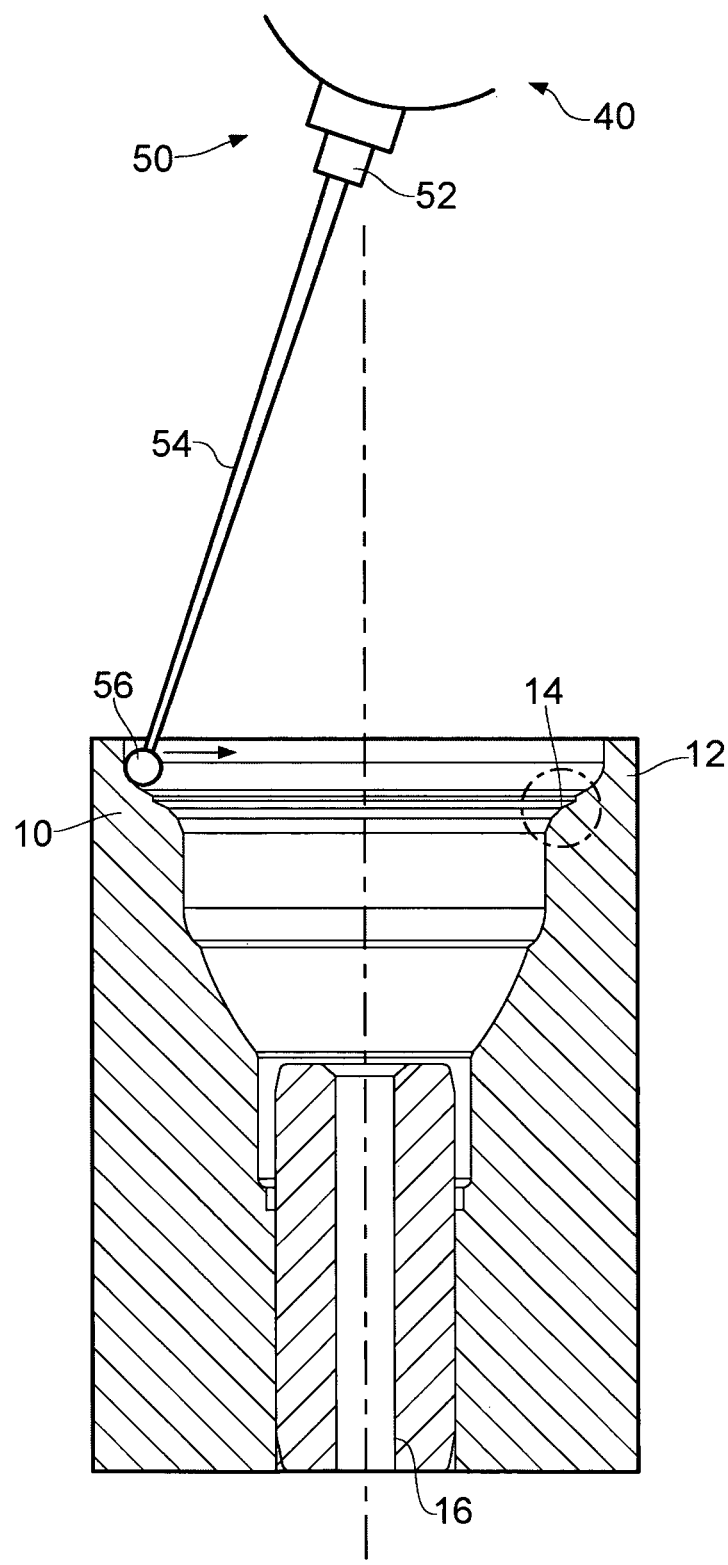
FIG. 6 is a schematic illustration of a valve seat part and valve guide being measured by a measurement probe mounted on an articulating probe head.
Figure 7:
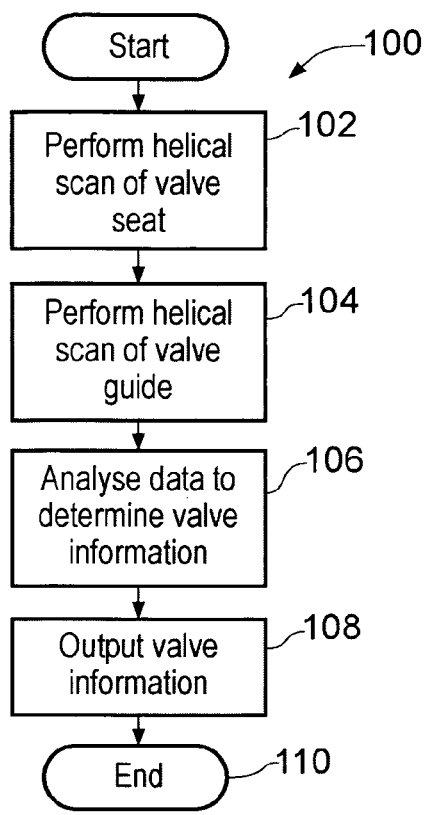
FIG. 7 is a flow chart illustrating the high level steps of a method of measuring and checking a valve.

FIG. 6 illustrates a side view of a vertical valve seat part 10 being scanned by the apparatus illustrated in FIGS. 4 and 5, and FIG. 11(a) illustrates the example path 17 the stylus tip 56 can take during measurement of the valve seat part 10. As shown, the path 17 progresses along the length of the valve seat part 10 in a cyclical, and in particular in a spiralling or helical manner around its inner surface. As will be understood, paths other than spiralling paths could be used to a similar effect. For instance, the path could progress along the length of the valve seat part 10 in an oscillating manner (i.e. in which the articulating head probe head causes the stylus tip to move or rotate back and forth as it progresses along the length of the valve seat part 10).

In a first step the centre line of the valve seat part 10 and maximum radius is determined, e.g. from CAD data or direct measurement. The regions of the valve seat part 10 just above and below the valve seat 13 are also measured, so this must be taken into account in choosing the maximum radius.

The centre of rotation of the articulating probe head (i.e. the intersection of the A1 and A2 axes) is aligned with the centre line of the valve seat part 10. The A2 head angle of the articulating probe head (i.e. position of shaft 48 about axis A2) is adjusted so that the workpiece contacting tip 56 of the measurement probe 50 contacts the inner surface of the valve seat part 10, just above the conical surface. The A1 head angle of the articulating head (i.e. the position of member 44 about axis A1) can be adjusted to move the workpiece contacting tip 56 in a circular path about the centre line of the valve seat part 10.

A spiral scan of the region of the valve seat part 10 is performed by moving the articulating probe head along the centre line whilst moving the workpiece contacting tip in a circular path about the A1 axis. Use of the spiral profile has the advantage of performing the measurement in a single scan and this profile also benefits from the higher dynamic response of the articulating probe head than the CMM.

This motion of the CMM and articulating head creates a spiral scan path along a cylindrical surface. However, the scan is adapted during its course to accommodate the actual shape of the region being measured (i.e. a conical surface).

The measurement probe 50 is kept within a defined measurement range, such as a defined stylus deflection range (e.g. between 40-50 microns). If the deflection is outside the range, the head angles of the articulating probe head 40 are adjusted to return the deflection to within its range. In this way, the scan is adapted to the surface shape.

In the example shown in FIG. 6, the A2 head angle is adjusted to reduce the radius of the circular scan, thereby maintaining the probe within its defined stylus deflection range.

For horizontal valve seat parts or other orientations, a combination of the A1 and A2 axes are adjusted to keep the measurement probe 50 within its measurement range.

Figure 11:
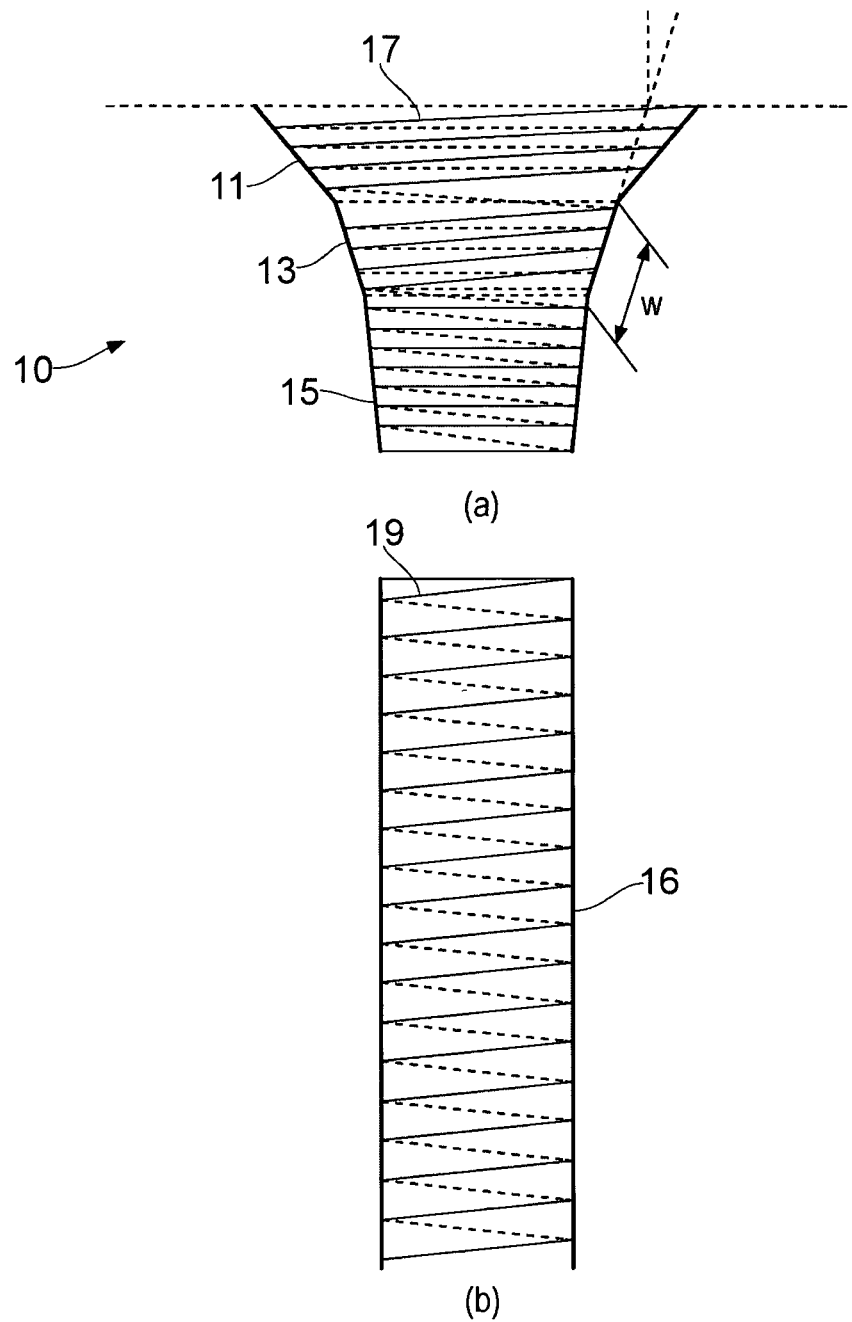
FIG. 11(a) is a schematic illustration of the valve seat part and the helical measurement path along the valve seat part taken by the stylus tip of the measurement probe shown in FIG. 5.
FIG. 11(b) is a schematic illustration of the valve guide and the helical measurement path along the valve guide taken by the stylus tip of the measurement probe shown in FIG. 5.

Once the valve seat 10 has been scanned by the measurement probe 50, the valve guide is then scanned by the measurement probe 50 at step 104. The cylindrical surface 14 of the valve seat part 10 is scanned using the technique for measuring bores as disclosed in WO90/07097. In particular, and as illustrated in FIG. 11(*b*), the path 19 of the tip 56 of the measurement probe 50 progresses along the length of the valve guide 16 in a cyclical, and in particular in a spiralling or helical manner around its inner surface. Again, paths other than spiralling paths could be used to a similar effect. For instance, the path could progress along the length of the valve guide 16 in an oscillating manner.

The use of a contact measurement probe 50 has the advantage of good accuracy of data points with fine detail over the measured area but non contact measurement probes may also be used, for example optical, capacitance or inductance probes.

The multiple data points obtained in steps 102 and 104 are then analysed at step 106, for example by the controller 58, to determine and check the shape of the valve seat 13 and valve guide 16, as described in more detail below with reference to FIG. 8. After analysis of the data, valve information is output at step 108. This could, for instance, include storing the output in a memory device for later use, and/or providing an output to the user via a visual indication device, such as a visual display unit for interpretation by the user. The method ends at step 110. As will be understood, the data need not be analysed by the same controller/computer 58 that controlled the obtaining the of the measurement information. Rather, the multiple data points obtained in steps 102 and/or 104 could supplied to another processor device, such as another computer, which analyses the data to obtain measurement information.

Figure 8:
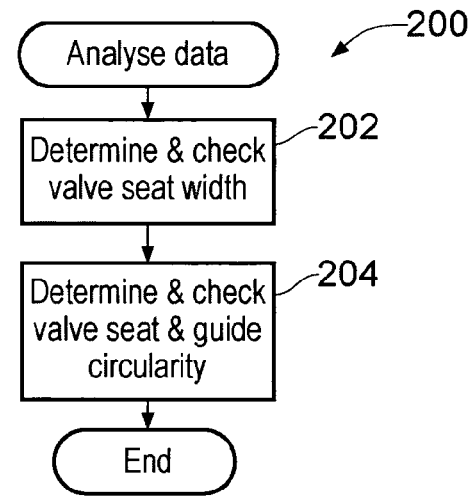
FIG. 8 is a flow chart illustrating the steps of analysing the data obtained during the measurement of a valve.

The high-level steps of analysing the data 106 are illustrated in the flow chart 200 shown in FIG. 8. In particular, analyzing the data comprises determining at step 202 the width "w" of the valve seat 13 (described in more detail below with reference to FIG. 9), and determining at step 204 circularity information regarding the valve seat 13 and valve guide 16 (described in more detail below with reference to FIG. 10).

Figure 9:
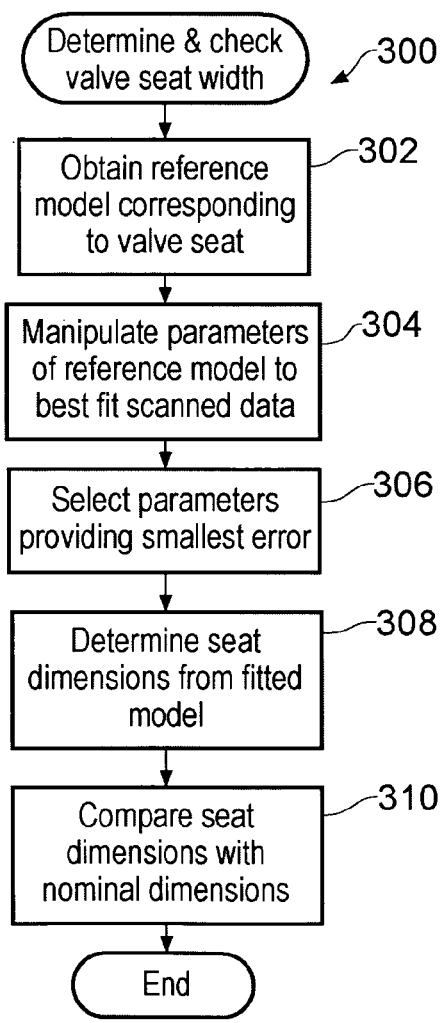
FIG. 9 is a flow chart illustrating the steps for determining and checking the valve seat width.

The process 202 of determining and checking the valve seat 13 width is illustrated in more detail in the flow chart 300 shown in FIG. 9. In particular, determining and checking the valve seat 13 width comprises at step 302 obtaining a reference model corresponding to the valve seat part 10 measured at step 102. The reference model could be retrieved from a memory device located for example in the controller 58. The reference model could be retrieved from a remotely located computer or storage device, for instance via the internet. Optionally, the reference model could be input by a user via an input device (not shown) connected to the controller 58. As will be understood, the reference model can comprise a set of parameters defining the geometry of a nominal valve seat part.

Figure 15:
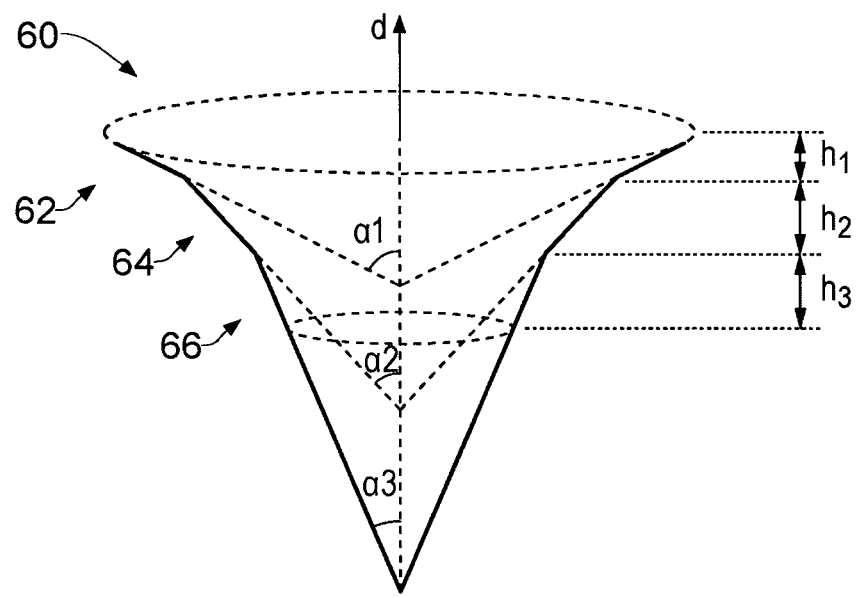
FIG. 15 is a schematic illustration of a model used to determine the dimensions of the valve seat part.

FIG. 15 schematically illustrates a model 60 suitable for use with the described method. In the current example, the object being measured is a valve seat part 10 comprising three cones of different angles sharing the same axis. Accordingly, the model 60 comprises parameters describing an upper 62, middle 64 and lower 66 conical portions relating to the three conical regions 11, 13, 15 respectively of the valve seat part 10. In particular, the model 60 contains a set of parameters describing three conical portions sharing (e.g. converging toward) a common axis "d", the parameters defining boundaries of the conical portions, for instance the boundaries of the heights "h" of the conical portions along the common axis "d" and also defining the angles "α" of the conical portions to the common axis "d".

Figure 12:
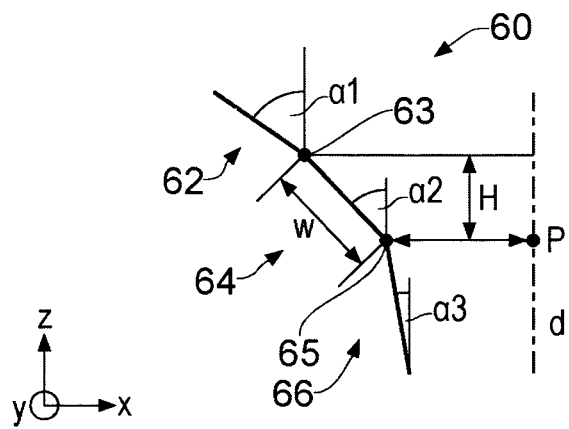
FIG. 12 is a schematic illustration of the parameters used to define the model illustrated in FIG. 15.

The set of parameters defining the model are described in more detail with reference to FIG. 12 which illustrates a part of a model 60. In particular, the middle cone 64, i.e. the portion of the model 60 corresponding to the valve seat 13, can be defined with respect to an axis "d" which is defined in terms of a direction and position in space. For example, the axis can be defined by four parameters, defining the translational position of the axis in X and Y dimensions (i.e. mutually perpendicular dimensions) and also defining the rotational position of the axis about the X and Y dimensions. The middle cone 64 can also be defined in terms of: a radius "r" being the distance between the axis "d" and the narrowest part of the middle cone 64 taken perpendicular to the axis "d" (i.e. the point 65 of intersection between the middle cone portion 64 and the lower cone portion 66); an angle "α2" between the slope of the surface of the middle cone 64 to the axis "d"; a height "H" being the distance between the intersections of the middle cone portion 64 with the adjacent upper 62 and lower 66 cone portions along the axis "d" (which in combination with α2, P and r defines the point 63 of intersection between the middle cone portion 64 and upper cone portion 66, e.g. the point at which they are linked); and the position "P" that the radius "r" is taken along the axis "d". These parameters are variable in such a way that each of the regions 62, 64, 66 can be independently altered (e.g. α3 and α1 can be changed independently from α2). However, each region is linked (e.g. tied) to its adjacent regions by at least a common point, and so the manipulation of some of the parameters may affect the form and/or location of different regions (depending on what is altered). For example, if any of α2, P or r is changed, then the point in space 63 at which the middle cone portion 64 and upper cone portion 66 which change. Depending on how the model 60 is set up, such a change could affect just the position of the upper cone portion 66 and/or its dimensions and orientation. However, as can be seen, alteration of α1 would not have a knock-on effect on either the middle 64 or lower 66 cone portions.

As will be understood, these parameters relating to the features of the model correspond to those features on the object which define the regions. For instance, in the embodiment described, the conical portions are defined by their interface with each other, and these parameters describe the location and form of these interfaces.

The valve seat 13 width "w" (being the extent of the middle cone 64 along the angle "α2") is one of the important properties of the valve seat part 10 that is difficult to measure with traditional methods. However, the width 'w' of the middle cone 64 is defined by its extent along the cone angle and can be determined from H and the cone angle "α2. The upper cone 62 can be defined by a second angle and the lower cone 66 can be defined with a third angle.

The next step 304 comprises manipulating the parameters of the model 60 to find the set of parameters that best describe the cloud of points that has been collected during the helical scan 102 of the valve seat part 10. As will be understood, manipulating the parameters can change the form of the model 60 (i.e. the shape and/or size of the model) as well as the location of the model 60 in the three dimensional measurement space. The set of parameters that best describe the cloud of points can be when the sum of the square of magnitude of the distances of the cloud of points to the model are minimised. This is what is commonly known as a least squares best fit. In the embodiment described, the independently alterable portions of the model are effectively fitted substantially contemporaneously to the cloud of points, rather than separately or in turn (e.g. rather than finding the best fit of one of the portions and then once decided on that moving on to find the best fit for the next portion without regard to the fit of the previous portion).

Step 304 can make use of an error function "f" that returns the minimum distance to the model for any point of the cloud of data can be used. Such an error function is well known and applied for the simple geometric shapes such as plane, circle, sphere, cylinder or cone. However, the shape to be fitted in the described example is not a simple geometric shape. Rather, it is a three-dimensional shape comprising a series of conical regions. Accordingly, a different way of calculating the error between the model and measurement information is needed to perform the least squares best fit (and is described in more detail below).

In the described embodiment, the valve seat part 10 is measured with a contact probe 50 that has a fixed sized stylus ball 56 that contacts the surface of the valve seat part 10. During the measurement steps of 102 and 104 the controller is actually recording the position of the centre of the stylus tip 56. Accordingly, the actual measured data is on a surface parallel to actual surface of the valve seat part 10.

As will be understood, a parallel surface is a surface where the minimum distance from any of its point to the reference surface is constant. For all the simple geometric features, the parallel surface is a surface of the same kind: the parallel surface of a plane is a plane offset in the direction of the plane normal; the parallel surface of a cylinder is a cylinder, the diameter of which is the diameter of the surface offset by the tip radius of the stylus.

Figure 13A:
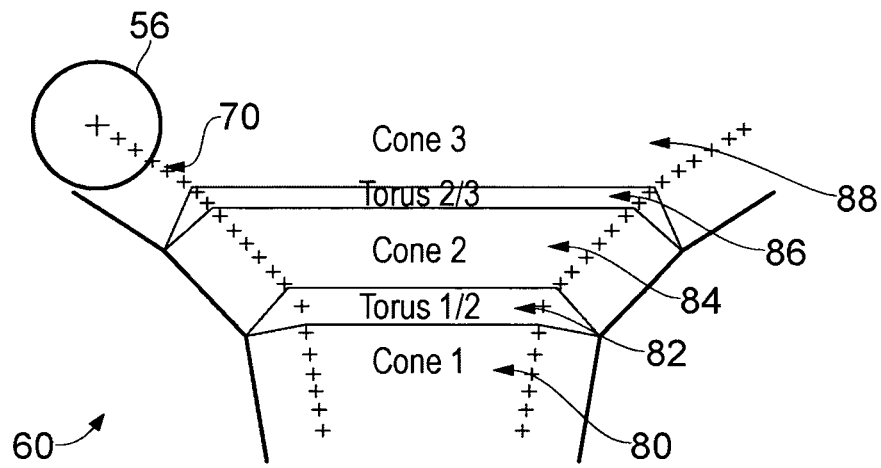
FIG. 13(a) is a schematic illustration of how the data points obtained during a measurement of the valve seat part relate to a first set of parameters defining a model of the valve seat part.
Figure 13B:
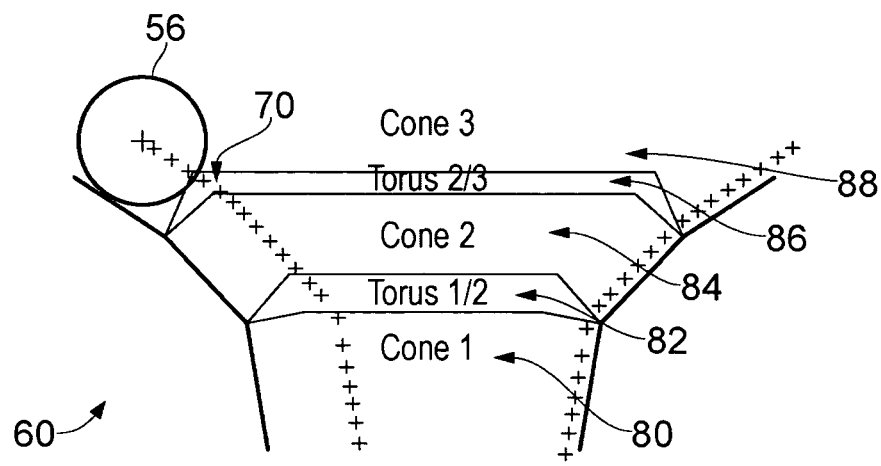
FIG. 13(b) is a schematic illustration of how the data points obtained during a measurement of the valve seat part relate to a second set of parameters defining a model of the valve seat part.

However, as mentioned above, the valve seat part 10 is not a simple geometric feature and its parallel surface is not of the same kind; hence the cloud of points obtained during step 102 will not represent a shape of the same kind to the model 60. This is schematically illustrated in FIG. 13(a), which shows that the cloud of points 70 corresponding to the conical regions of the valve seat part 10 are conical in shape, however the parallel the cloud of points at the intersection of two cones have the shape of a part torus.

Accordingly, the method for calculating the error between the model and the measurement information takes these factors (i.e. the tip radius effect and the dissimilar parallel shape effect) into account.

In particular, the method comprises using a different error function for different sections of the measurement information. In particular, the error function used for a particular data point depends on where the data point is along the axis. For example, with reference to FIG. 13(a) the error function used for a particular point depends on whether the point is inferred to fall in the lower cone area 80 ("cone 1"), the lower/middle part torus area 82 ("torus 1/2"), the middle cone area 84 ("cone 2"), the middle/upper torus area 86 ("torus 2/3") or the upper cone area 88 ("cone 3"). Until the best fitting is complete, the method is unaware of which measurements points relate to which areas. Accordingly, the method infers which points of the measurement information fall within which areas based on the parameters of the model. It can do this by projecting the areas of the model on the measurement information. Therefore, the better the model parameters reflect the actual measurement points, the better the assumption of which measurement points relate to which area. In the example shown in FIG. 13(a), the model parameters reflect the actual measurement points quite well and so the projection of the areas onto the measurement points provides a good assumption of which measurement points relate to which area. In the example shown in FIG. 13(b), the model parameters do not reflect the actual measurement points well and so the projection of the areas onto the measurement points provides a bad assumption of which measurement points relate to which area.

The actual error function used for each area can be any well known standard error function. However, the specific values used in the error functions vary between the error functions for different sections due to the different properties of the model in each section.

Furthermore, the error functions used compensate for the tip 56 radius by taking the tip radius into account. This could be done for example by subtracting the tip radius from the errors calculated.

The total sum of the square of the distance ("F") for a model having a given set Of parameters can then be calculated using the following equation:

$$F = \Sigma f^2_{cone1} + \Sigma f^2_{cone2} + \Sigma f^2_{cone3} + \Sigma f^2_{torus1/2} + \Sigma f^2_{torus2/3} \tag{1}$$

The number of points in the part torus areas 82, 84 are relatively small compared to those number of points in the conical areas. Accordingly, in order to simplify and increase the efficiency of the method for determining the best fit parameters, the measurement information which are assumed to relate to the part torus areas 82, 84 can be ignored during determining the total sum of the square of the distance ("F") for a model having a given set of parameters. Accordingly, F could be determined as follows:

$$F = \Sigma f^2_{cone1} + \Sigma f^2_{cone2} + \Sigma f^2_{cone3} \tag{2}$$

The value of F is then minimised in order to obtain the set of parameters that defines the best valve seat fitting the cloud of points. This minimisation is a least square optimisation that can be performed for example with the well known Gauss-Newton minimisation or one of its variation such as the Levenberg-Marquard minimisation.

Dimensions of the valve seat part 10 can now be determined at step 308 from the parameters describing the fitted model 60. In particular, for example, the width "w" of the valve seat 13 of the measured object can now be accurately determined from the parameters which define the location of the interfaces of the middle conical portion 64 with its adjacent upper 62 and lower 64 conical portions.

The best fitted model also allows the determination of other particular dimensions and location of parts of the valve seat part 10. In particular, it allows the determination of the gauge diameter on the valve seat 13 (e.g. the position of the valve seat 13 along the axis "d"), the position of the gauge on the seat, the width of the seat, the angle of the seat, the angles of both upper and lower cones.

Dimensions determined from the fitted model 60 can then be compared with nominal dimensions to determine the deviation of the dimensions of the valve seat part 10 from the desired dimensions. For instance, the width "w" can at step 310 be compared with a nominal width of the valve seat to determine how well the valve seat 13 of the measured valve seat part 10 complies with the desired dimension.

Figure 10:
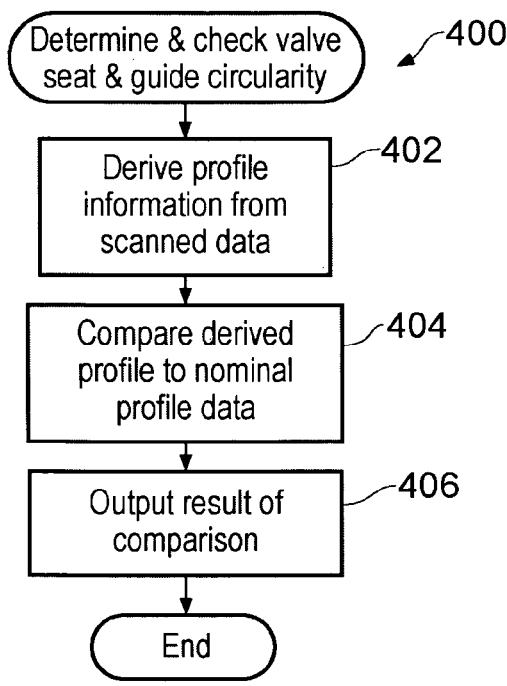
FIG. 10 is a flow chart illustrating the steps for determining and checking the valve seat and valve guide circularity.
Figure 14A:
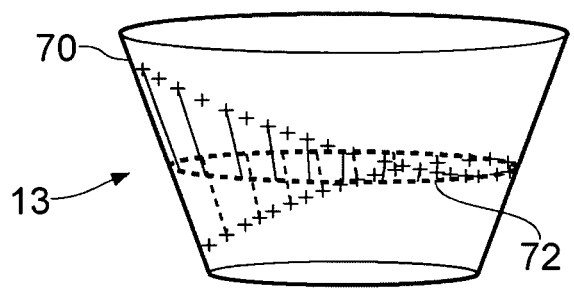
FIG. 14(a) illustrates the projection of a plurality of data points obtained during a helical scan of the valve seat onto a plane for calculating the circularity of the valve seat in a plane.
Figure 14B:
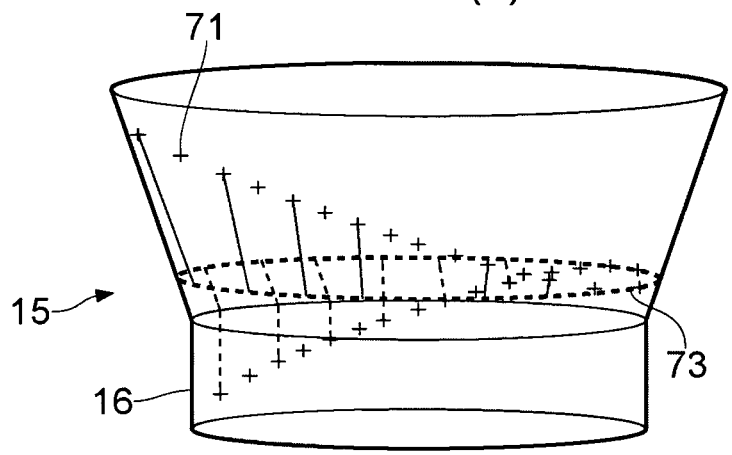
FIG. 14(b) illustrates the projection of a plurality of data points obtained during a helical scan of the border of the valve seat part with the cylindrical valve guide onto a plane for calculating the circularity of the valve seat part in a plane.

The process 204 of determining and checking the valve seat 13 and valve guide 16 circularity data is illustrated in more detail in the flow-chart 400 shown in FIG. 10. The process will be described in connection with determining and checking the circularity of the valve seat 13, but as will be understood, the same method can be used for checking the circularity of the valve guide 16. The process begins at step 402 by deriving the cross-sectional profile of the valve seat 13 in a particular transverse plane from the helical data (which extends through the plane). For instance, FIG. 14(*a*) schematically illustrates a series of measurement points 70 obtained during a helical scan of the valve seat 13. The derivation is performed by first identifying a band of consecutive measurement points containing a first complete helix in the measurement information and then identifying a plane that extends across the cone and which contains the middle of the helix (i.e. the point half way between the highest and lowest measurement point). The next step comprises projecting each measured point 70 in the helix in a direction consistent with the shape of the object between the measurement point 70 and the plane 72 (i.e. along the local cone generatrices) of which the circularity is to be determined. Accordingly, a point on the plane can be inferred by mapping an actual measured point onto the plane taking into consideration the shape of the object between the measurement point and the plane.

As will be understood, the method need not necessarily comprise projecting each measured point onto the plane. Rather a selection of only some of the measured points could be used, for instance every other measurement point could be used. In any case, the projected points are then best fitted onto a circle and the circularity can then be determined in the normal way, for instance by determining the span between the minimum and maximum errors of the projected points with the best fit circle.

Figure 16:
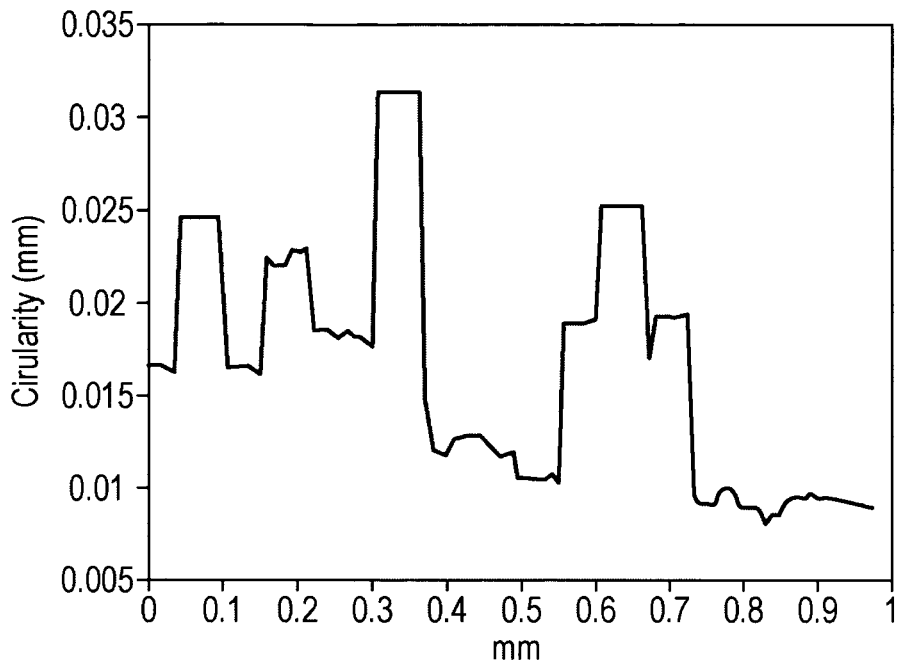
FIG. 16 is a graph illustrating the variation in circularity along the valve seat.

This process can be repeated a plurality of times along the length of the valve seat 13 in order to determine the circularity of the valve seat along its length. For example, this can comprise sliding the selection of points that form a full helix down along the valve seat and then repeating the projection and circularity determination steps for that new selection of helical data. FIG. 16 shows a graph illustrating the determined circularity error for one hundred different full helix sections taken along the length of the valve seat 13, each having been determined using the above described method. As can be seen, the circularity error varies along the length of the valve seat 13.

As will be understood, the series of measurement points obtained during one turn of the helical scan may cross the border between two different regions of the valve seat part. The series of measurement points obtained during one turn of the helical scan may cross the border between the valve seat part and the valve guide (e.g. between two different uniform parts of the valve). In these situations, the projection of points onto a plane across the valve and located within the region of the measurement points obtained during one turn of the helical scan requires the generatrices of both regions to be taken into consideration. For instance, FIG. 14(*b*) illustrates the situation in which the measurement points 71 obtained during one turn of the helical scan cross the border between the lower conical region 15 of the valve seat part 10 and the valve guide 16. Accordingly, deriving the cross-sectional profile of the lower conical region 15 in a particular plane 73 from the helical data requires projecting some of the points (e.g. those points measured on the conical surface of the lower conical region 15) in a direction consistent with the shape of the lower conical region 15 onto the plane 73, and projecting some of the points (e.g. those points measured on the cylindrical valve guide 16) for part of the way in a direction consistent with the cylindrical valve guide 16 shape (i.e. parallel to the cylindrical valve guide's 16 axis) and then for the rest of the way in a direction consistent with the shape of the lower conical region 15 onto the plane 73.

In the embodiments described above the measurement points are projected along straight lines onto the plane. However, as will be understood, this need not be the case, for instance if the shape of the object between the measurement point and the plane onto which the measurement point is projected is curved, then the measurement point can be projected along a curve of the same shape onto the plane.

In addition to, or alternatively to, determining circularity data, run-out information (e.g. information describing how the surface profile position of the valve seat relative to a fixed axis varies along the length of the valve seat) can be determined from the points projected onto a plane from helical data.

As will be understood, the method described above for determining and checking the circularity of the valve seat 13 can also be used for checking the circularity of the valve guide 16. In summary, the cross-sectional profile of the valve guide 16 in a particular plane can be derived from data obtained by helical scanning procedure by projecting each measured point in the helix along the guide valve's axis onto the plane of which the circularity is to be determined.

Figure 17B:
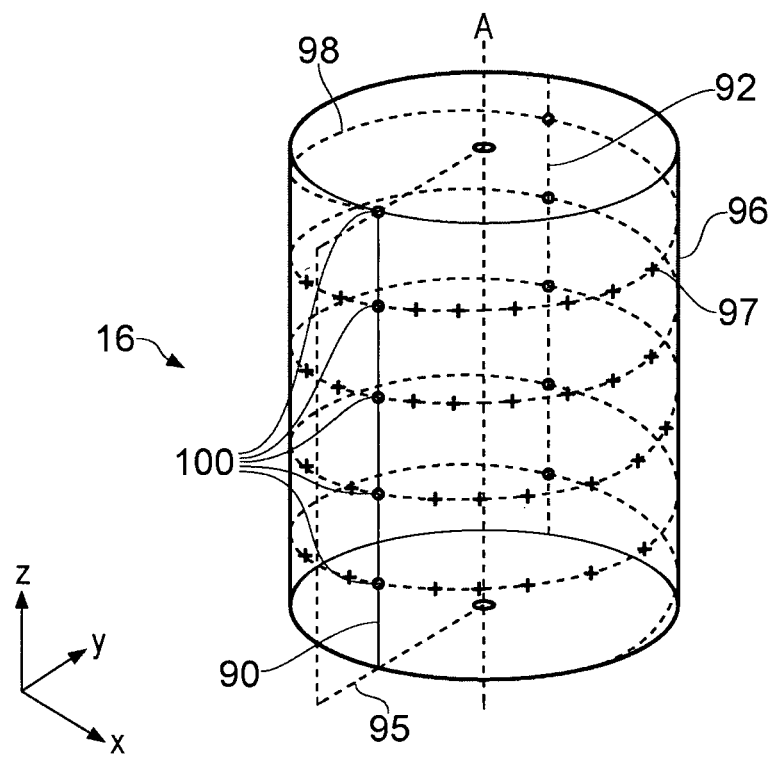

In the above described embodiment, the profile of the valve that is determined from the helical scan and checked against nominal data concerns the profile of the valve in a transverse plane. However, as will be understood, the profile of the valve in other planes, e.g. sagittal planes, can be determined from the helical scan and checked against nominal data. For instance, the straightness profile of the valve guide 16 can be determined and checked. One example of how this can be done is described in connection with FIGS. 17(*a*) and (*b*). In a broad sense, this is done by fitting at least one straight line 90 to a selection of points 94 of the measurement points 75 obtained during a helical scan adjacent a line extending along the length of the valve guide 16 (in this case substantially parallel to the longitudinal axis of the valve guide 16) which crosses the path defined by the measurement points 75 at a plurality of points along the object's length. More particularly, this can be done by first best fitting a cylinder 96 (i.e. the expected shape of the measured object) to the measurement points 75, then obtaining a central axis A from the fitted cylinder 96. A sagittal plane illustrated by the dash and double dot line 95 (i.e. a plane which extends substantially parallel to the longitudinal axis of the valve guide) can then be identified which contains the longitudinal axis A and also the line of the surface of the valve guide 16 for which the profile information is to be determined. The measurement points along the measurement path that are closest to the plane 95 are selected and then projected onto the plane 95 in a manner consistent with the shape of the object between the plane and measurement point. This is more clearly illustrated in FIG. 17(*b*) which for the sake of illustration shows that only a few measurement points 97 (represented by crosshairs) are actually obtained along the measurement path 98 (illustrated by the fine dotted helical line). As illustrated by the solid arrows, the measurement points closet to the plane 95 (represented by bold crosshairs) are selected and then projected (in a manner consistent with the shape of the surface of the object between the measurement point and the plane 95) onto the plane 95. Accordingly, in this embodiment the measurement points are projected along a curved line consistent with the curvature of the cylindrical form of the object. A line 90 is then best fitted to the points 100 as projected onto the plane 95.

The straightness can then be determined by calculating the deviation of the points 94 from that line 90. As illustrated in FIG. 18 (which, for the ease of illustration, is an exaggerated illustration of the relative position of the points 100 as projected onto the plane 95 relative to the best fit line 90 as viewed) the form error of the straightness profile of the measured valve guide 16 can be determined by determining the span between the maximum (max) deviation from the best fitted line and the minimum (min) deviation from the best fitted line.

As will be understood, this same technique could be used for the valve region part 10 in order to determine the profile of the valve seat part 10 along its length. Accordingly, in this case the line to be fitted to the points projected onto a plane which wholly contains the axis ("d") and extends radially outwardly through the surface of the valve seat part 10 will not be straight, but will comprise three intersecting straight lines (like that shown in FIG. 12).

This can be repeated a number of times (e.g. as shown by line 92) for a plurality of such points around the helically scanned measurement points 75.

As will be understood, for the sake of simplicity of illustration, the helix of measurement points is shown in the Figures as being quite loose, but in reality can be a much tighter helix.

Although the above embodiments describe the measurement of a valve seat and valve guide, the same method of determining information relating to the surface profile of an object in a plane extending across the object from a series of surface measurements of the object that extend obliquely to the plane is suitable for other surface features. It is a particularly useful method for measuring face seals amongst other applications. It is not necessary for the surface feature to have symmetry about a centre line, as described but this does ease speed of scanning.

Although the use of an articulating scanning head on a coordinate measuring machine is described for gathering the measurement information, other techniques may be used but the above described technique has the advantage of speed and accuracy.

The valves described above are of the type found in cylinder heads of automotive engines, for example.

The invention claimed is:

1. A method for measuring a feature of an object, the method comprising:
    using a surface sensing measurement probe mounted on a coordinate positioning apparatus to measure at least the feature of the object and thereby acquire, based on feedback from the measurement probe, a representation of at least the feature that comprises multiple data points;
    fitting, by an analysis device, a model of at least the feature of the object to the representation, the model comprising parameters defining at least two independently alterable portions that each replicate a different region on the surface of the object and that are linked along a common edge so that a certain alteration of at least one of the at least two independently alterable portions causes a consequential alteration of another of the at least two independently alterable portions, the fitting comprising changing the form of the model by altering at least one of the at least two independently alterable portions;
    obtaining information regarding at least the feature from the fitted model;
    analyzing the information to determine deviations of at least the feature from a nominal feature; and
    providing an output based thereon.

2. A method as claimed in claim 1, in which at least one parameter defines the edge at which the portions are linked.

3. A method as claimed in claim 2, in which the information is derived from the at least one parameter that defines the edge at which the portions are linked.

4. A method as claimed in claim 1, comprising manipulating the edge at which the portions are linked.

5. A method as claimed in claim 4, comprising manipulating the location of the edge at which the portions are linked.

6. A method as claimed in claim 1, in which the regions are looped in configuration.

7. A method as claimed in claim 6, in which at least one region is conical in configuration.

8. A method as claimed in claim 1, in which the model comprises parameters defining a series of at least three independently alterable portions of which at least one intermediate portion is linked to the other two portions.

9. A method as claimed in claim 8, in which the at least three independently alterable portions each replicate a different region on the surface of the object, and in which one of the at least three independently alterable portions is linked along a first edge to one of the other of the at least three independently alterable portions and along a second edge opposite the first edge to another of the at least three independently alterable portions.

10. A method as claimed in claim 9, in which the information comprises the distance between the opposing edges.

11. A method as claimed in claim 1, in which the fitting comprises identifying different parts of the representation, comprising at least two parts each of which are inferred to relate to one of the at least two independently alterable portions of the model.

12. A method as claimed in claim 11, in which the fitting comprises using a different error function for each different part of the representation.

13. A method as claimed in claim 1, comprising identifying at least one linking part of the representation that is inferred to relate to the edge at which the at least two independently alterable portions are linked, and in which the fitting comprises ignoring that at least one linking part.

14. A method as claimed in claim 1, in which the representation comprises at least one part of the object adjacent the feature.

15. A method as claimed in claim 14, in which at least one of the at least two independently alterable portions of the model relates to the feature and at least one of the at least two independently alterable portions relates to the part of the object adjacent the feature.

16. A method as claimed in claim 1, in which the fitting of the model comprises best fitting the model.

17. A method as claimed in claim 1, in which the feature comprises a valve seat of a valve.

18. A method as claimed in claim 1, in which the obtaining information comprises obtaining measurement information regarding at least the feature of the object.

19. A method as claimed in claim 1, in which the at least two alterable portions are contemporaneously fitted to the model.

20. A method as claimed in claim 1, in which:
the feature is a three-dimensional component of the object, and
the representation of the feature describes the multiple data points in three-dimensional space.

21. A method as claimed in claim 1, wherein another alteration of the at least one independently alterable portion does not cause a consequential alteration of the other independently alterable portion.

22. A method as claimed in claim 1, wherein:
the coordinate positioning apparatus is a coordinate measuring machine having an articulating probe head to which the surface sensing measurement probe is mounted,
the surface sensing measurement probe is a contact measurement probe, and
the object is a valve seat part.

23. A method as claimed in claim 1, wherein the feature of the object is a valve seat.

24. A method for evaluating a feature of an object, the method comprising:
taking a representation of at least the feature of the object, the representation comprising multiple data points acquired via surface measurement of at least the feature by a surface sensing measurement probe mounted on a coordinate positioning apparatus;
fitting, by an analysis device, a model replicating at least the feature of the object to the representation, the model comprising parameters defining at least two independently alterable portions that each replicate a different region on the surface of the object and that are linked along a common edge so that a certain alteration of at least one of the at least two independently alterable portions causes a consequential alteration of another of the at least two independently alterable portions, the fitting comprising changing the form of the model by altering at least one of the at least two independently alterable portions;
obtaining information regarding at least the feature from the fitted model;
analyzing the information to determine deviations of at least the feature from a nominal feature; and
providing an output based thereon.

25. A method as claimed in claim 24, wherein another alteration of the at least one independently alterable portion does not cause a consequential alteration of the other independently alterable portion.

26. A non-transitory computer-readable medium storing a program, the program comprising instructions causing a controller configured to measure a feature of an object to perform the steps of:
causing a surface sensing measurement probe mounted on a coordinate positioning apparatus to measure at least the feature of the object and thereby acquire, based on feedback from the measurement probe, a representation of at least the feature that comprises multiple data points;
fitting a model replicating at least the feature of the object to the representation, the model comprising parameters defining at least two independently alterable portions that each replicate a different region on the surface of the object and that are linked along a common edge so that a certain alteration of at least one of the at least two independently alterable portions causes a consequential alteration of another of the at least two independently alterable portions, the fitting comprising changing the form of the model by altering at least one of the at least two independent alterable portions;
obtaining information regarding at least the feature from the fitted model;
analyzing the information to determine deviations of at least the feature from a nominal feature; and
providing an output based thereon.

27. A non-transitory computer-readable medium as claimed in claim 26, wherein another alteration of the at least one independently alterable portion does not cause a consequential alteration of the other independently alterable portion.

28. A method for measuring a feature of an object, the method comprising:
using a surface sensing measurement probe mounted on a coordinate positioning apparatus to measure at least the feature of the object and thereby acquire, based on feedback from the measurement probe, a representation of at least the feature that comprises multiple data points;
fitting, by an analysis device, a model of at least the feature of the object to the representation, the model comprising parameters defining at least two independently alterable portions that are linked at a common point so that (i) a certain alteration of at least one of the at least two independently alterable portions causes a consequential alteration of another of the at least two independently alterable portions and (ii) another alteration of the at least one independently alterable portion does not cause a consequential alteration of the other independently alterable portion, the fitting comprising changing the form of the model by altering at least one of the at least two independently alterable portions;
obtaining information regarding at least the feature from the fitted model;
analyzing the information to determine deviations of at least the feature from a nominal feature; and
providing an output based thereon.

29. A method for measuring a feature of an object, the method comprising:
using a surface sensing measurement probe mounted on a coordinate positioning apparatus to measure at least the feature of the object and thereby acquire, based on feedback from the measurement probe, a representation of at least the feature that comprises multiple data points;
fitting, by an analysis device, a model of at least the feature of the object to the representation, the model comprising parameters defining at least two independently alterable portions that each replicate a different region on the surface of the object and that are linked along a common edge, the fitting comprising changing the form of the model by altering at least one of the at least two independently alterable portions;
obtaining information regarding at least the feature from the fitted model;
analyzing the information to determine deviations of at least the feature from a nominal feature; and
providing an output based thereon.

* * * * *